United States Patent
Shah et al.

(10) Patent No.: US 7,039,422 B2
(45) Date of Patent: May 2, 2006

(54) HIGH-SPEED LOCALIZED DATA EXCHANGE

(75) Inventors: Yogendra Shah, Devon, PA (US); Narayan P. Menon, Old Bethpage, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/629,506

(22) Filed: Jul. 29, 2003

(65) Prior Publication Data

US 2004/0023663 A1 Feb. 5, 2004

Related U.S. Application Data

(60) Provisional application No. 60/399,888, filed on Jul. 31, 2002.

(51) Int. Cl.
*H04Q 7/20* (2006.01)

(52) U.S. Cl. ............................... 455/456.1; 455/456.2; 455/422.1

(58) Field of Classification Search ............. 455/422.1, 455/435.2, 436, 440, 456.1
See application file for complete search history.

(56) References Cited

U.S. PATENT DOCUMENTS

| | | | |
|---|---|---|---|
| 5,970,414 A | * | 10/1999 | Bi et al. ................... 455/456.3 |
| 6,005,884 A | * | 12/1999 | Cook et al. ................. 375/132 |
| 6,285,868 B1 | | 9/2001 | LaDue |
| 6,438,117 B1 | | 8/2002 | Grilli et al. |
| 6,603,966 B1 | | 8/2003 | Sheffield |

* cited by examiner

*Primary Examiner*—Temica Beamer
(74) *Attorney, Agent, or Firm*—Volpe and Koenig, P.C.

(57) ABSTRACT

A cellular network monitors the location of a wireless transmit/receive unit (WTRU). The cellular network is also aware of the location of each data pump capable of communicating with the cellular network. The data pump capable of transmitting data at a high data rate. The cellular network coordinating a high data rate transfer between the WTRU and the data pump.

22 Claims, 3 Drawing Sheets

US 7,039,422 B2

HIGH-SPEED LOCALIZED DATA EXCHANGE

CROSS REFERENCE TO RELATED APPLICATION(S)

This application claims priority from U.S. Provisional Application No. 60/399,888, filed on Jul. 31, 2002, which is/are incorporated by reference as if fully set forth.

FIELD OF INVENTION

This invention relates to wireless digital communications. More particularly, the invention relates to the interaction between cellular networks and localized networks for the purpose of providing a high-speed localized data exchange.

BACKGROUND

Mobile wireless communication has progressed from closed platforms in primarily voice-based cellular phones to becoming embedded in a variety of open platforms which support data and voice such as smartphones, notebook computers and personal digital assistants (PDAs). Currently many different types of wireless communication systems, such as WLANs and cellular networks, can provide different levels of services. When a user desires to use different levels of service for a geographic area with which they are not familiar, it is difficult to determine which services are available. Often, a user must contact the wireless service provider to determine which types of services are available in which geographical areas. If the user travels in many different geographic areas, the burden of trying to determine which services are available in which geographic areas becomes too great.

Consumer products are also migrating toward wireless connected devices. For example, digital cameras are being incorporated into wireless cell phones, which can transfer large volumes of image data transparently from the camera to the user's home or a desired Web host. This eliminates the tedious requirement of connecting to a PC for data exchange. As the capabilities of these wireless devices (and the associated memory requirements) grow, there is a pressing need to offer data exchange and synchronization capabilities, such as picture downloading, email exchange and location-specific information targeted at a user. To facilitate this need, high speed wireless connections are required.

Traditional wireless networks are primarily designed for full time connectivity of audio signals from multiple users. While such a system can handle large bandwidth file transfers, generally the system is optimized for audio (telephone) communications and may not effectively be able to handle large bandwidth files efficiently. With current generation mobile wireless systems, the data is transferred at rates of between 10 and 100 Kb/s. With more advanced third generation (3G) networks, the data rates may be as high as 2 Mb/s. Even at this rate, the transfer of 10 Mb of data would take at least 5 seconds. It is desirable to have a low-cost high-data rate network, which supports the wireless transfer of large volumes of data.

SUMMARY

A cellular network includes a data pump or other high data rate wireless interface which is capable of accepting large bursts of data from a wireless transmit/receive unit (WTRU). The cellular network monitors the location of a WTRU and is also aware of the location of each data pump capable of communicating with the cellular network. The data pump is capable of transmitting and receiving data at a high data rate. The cellular network coordinates data transfer at a high data rate between the WTRU and the data pump.

DETAILED DESCRIPTION OF THE PREFERRED EMBODIMENT(S)

The present invention will be explained with reference to drawing figures where like numerals represent like elements throughout. Hereafter, a wireless transmit/receive unit (WTRU) includes but is not limited to a user equipment, mobile station, fixed or mobile subscriber unit, pager, or any other type of device capable of operating in a wireless environment.

Figure 1:
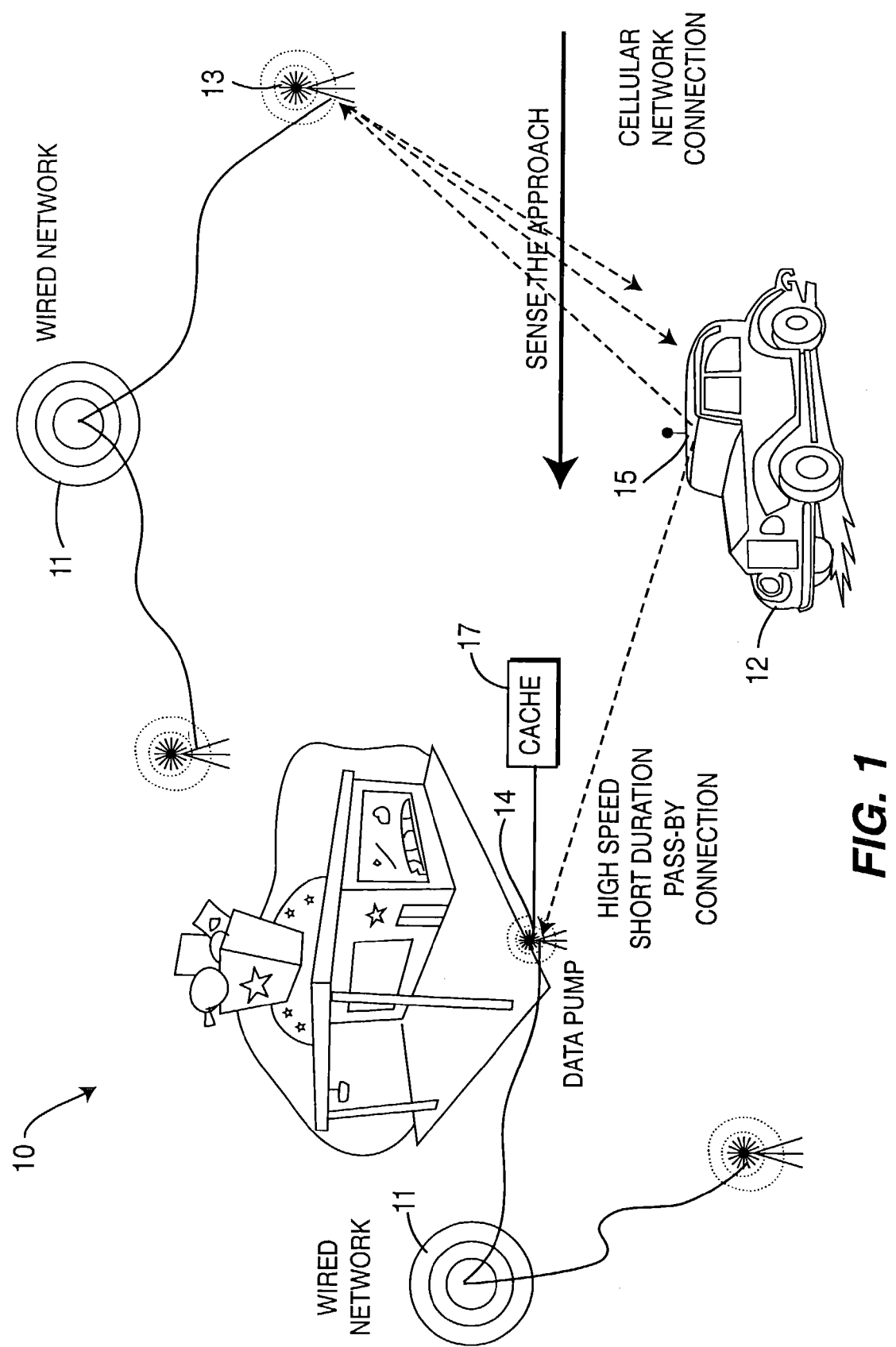
FIG. 1 depicts a wireless transmit/receive unit (WTRU), which communicates with a wired network via base stations and data pumps.

FIG. 1 comprises a cellular network 10, which is connected to a wired network 11 via a wireless or a wired connection, and is in wireless connection. A WTRU 15 is wirelessly communicating with the cellular network 10.

The wired network 11 typically comprises a public switch telephone network (PSTN). The cellular network 10 comprises a plurality of selectively-placed base stations 13 and a plurality of selectively-placed data pumps 14. The data pumps 14 are configured to provide localized data transfer. Since data transfer is effected through the data pumps 14 and the WTRU 15, the data pumps 14 would be considered to be localized base stations. The data pumps 14 may be limited in the types of data they are able to transfer, however.

In the exemplary embodiment, the cellular network 10 monitors the location of the WTRU 15 at all times. The location may be determined using triangulation from the base stations 13, or via the WTRU 15 being equipped with a GPS receiver (not shown). The location determination may also utilize another type of location sensing system. The cellular network 10 is also aware of the location of each data pump 14.

The capability of the wired network 11 to transmit data is limited to the bandwidth capabilities of the various parts of the wired network 11. In some implementations, parts of the wired network may have a data capacity (bandwidth) more limited than that of individual ones of the data pumps 14. In the case of the cellular network 10, its wired components are typically configured for data transfer rates consistent with particular services offered by that network 10. Accordingly, the bursty data transfers of large amounts of data could possibly be beyond the capabilities of the cellular network 10. To facilitate transmission of data at a rate exceeding the capability of the wired portion of the wireless network, the data is cached. The data is transferred along the wired potion of the network at a data rate consistent with the wired portion, cached and transferred to the data pump 14 at its data rate.

Caching data may also be used when the data transfer does not exceed the wired network capabilities. Such caching avoids data congestion problems, which would otherwise occur when the wired network 11 is operating at a maximum capacity. This caching also allows for data transfer negotiation between the data pump 14 and the WTRU 15.

Each data pump 14 is capable of accepting large bursts of data from the WTRU 15. The data pump 14 may use a high data rate wireless interface, such as used by some WLANs, although data pumps not related to WLANs may also be used. The WTRU 15 is "always connected" to the cellular network 10 through a primary connection. The cellular network 10, noting the location of the WTRU 15, assesses the need to provide a data pump 14 connection to support an exchange of information. A data cache 17 is provided for storing data transferred through the data pump 14. The data cache can be implemented using any convenient mechanism for storing data on a temporary basis and has the purpose of caching data received at different rates. While shown in association with a single data pump 14, it is also possible to provide a data cache 17 to serve multiple data pumps 14.

In the case of data to be transmitted by the WTRU 15, the data cache 17 receives data at a rate limited by the capabilities of the WTRU 15 and the data pump 14. In the case of data to be transmitted by the data pump 14 to the WTRU 15, it is advantageous to predict which data pump 14 will be in communication with the WTRU 15. In that manner, the data provided through the data pump 14 to the WTRU 15 can be made resident in the data cache 17 prior to the arrival of the WTRU 15. This data can be provided through multiple data pumps 14, which would reduce the degree of precision required to identify the cognizant data pump 14. Predicting movement is also advantageous because the location of the WTRU 15 may be changing during the negotiation period.

Knowing the location of the WTRU 15, and the strategic placement of the data pumps 14, the cellular network 10 coordinates the exchange of command and control information between the WTRU 15 and the wired network 11 through the cellular network 10. Through frequent updating of the location information for the cellular unit 15, the cellular network 10 is able to "sense" the approach of the WTRU 15 and prepares for the information exchange between the WTRU 15 and the data pump 14. Identification of the need to exchange the information and subsequent preparation of the data is facilitated through the "always-on" connection between the WTRU 15 and the wide area connection of the cellular network 10.

In the event that a WTRU 15 wishes to transfer a large file, the WTRU 15 sends a signal to the network 10 indicating the request to transfer the file. Unless the file transfer request self-identifies as, including a large file identifier, the request for data transfer would be accomplished in the manner of standard data rate requests. The protocols for data transfer are defined by the cellular network 10 and the WTRU 15.

When the file transfer request is received by the cellular network 10, the cellular network 10 determines a location of the WTRU 15 and projects future locations of the WTRU 15 based on a pattern of prior WTRU locations. This location projection can be achieved either by predictive mapping programs or other location techniques. In the simplest case the location projection can be achieved by determining the locations of data pumps 14 which are in closest proximity to the WTRU 15. Alternately, the WTRU 15 may detect the data pump 14, if the data pump is capable of being sensed by the WTRU 15. The data to be provided to the WTRU 15 is transferred to a data pump 14, and when the WTRU 15 comes within range of the data pump 14, the data is transferred.

In the case of the WTRU 15 uploading data to the data pump 14, this can be accomplished without prior knowledge by the cellular network 10 of the proximity of the WTRU 15 to the data pump 14. If the WTRU 15 is going to be in the vicinity of a data pump for only a few moments then the WTRU 15 would need to continually scan for the beacon channel for the data pump, thus draining battery power. Existing mobile networks are designed to facilitate low power consumption of a WTRU 15 whilst maintaining an always on connection. Nevertheless, such scanning may be accomplished, for example, in response to input from the user. The WTRU 15 uploads the data after detecting the data pump 14, such as by detecting a data pump beacon. In the exemplary embodiment, however, the data transfer between the WTRU 15 and the data pumps 14 is centrally managed by the cellular network 10.

In the case of the WTRU 15 downloading data to the data pump 14, the cellular network 10 would preferably know the WTRU 15 is or will be in the vicinity of the data pump 14. If the WTRU 15 is going to be in the vicinity of a data pump for only a few moments then the WTRU 15 would need to continually scan for the beacon channel for the data pump, thus draining battery power. Alternatively, the cellular network 10 can provide the handoff information to the WTRU 15. The WTRU 15 downloads the data after detecting the data pump 14, such as by detecting a data pump beacon, although the data transfer between the WTRU 15 and the data pumps 14 is preferably centrally managed by the cellular network 10.

While the WTRU 15 is traveling, it passes close to strategically located data pumps 14, which are capable of providing a burst-mode, short-connection time high-speed connection. Since, in the exemplary embodiment, the cellular network 10 is aware of the geographic placement of the data pumps 14, it can monitor the need for data exchange to/from the WTRU 15 and match the WTRU location information with the geographic data pump locations to the identify the nearest available data pump 14.

To facilitate the information exchange between the data pump 14 and the WTRU 15, the cellular network 10 allocates resources. In the exemplary embodiment, this is accomplished under the control of the cellular network 10. As the WTRU 15 approaches the vicinity of the data pump 14, a connection is established.

The cellular network 10 establishes a trajectory of the WTRU 15 based on location data, and in some cases historical data. When the trajectory places the future location of the WTRU 15 within range of a data pump 14, the cellular network 10 facilitates transfer of data. This procedure includes: 1) request transfer of data; 2) plot a path of the WTRU 15 (if not already available); 3) determine the nearest data pump 14 along the path; and 4) negotiate data transfer between the data pump 14 and the WTRU 15.

The cellular network 10 informs the WTRU 15 to establish a connection with the data pump 14 and the transfer of data is commenced. While the connection is maintained, the data pump 14 facilitates maintenance of the link quality through power control and link management between the WTRU 15 and the data pump 14. Data connection can be either by hard handover or soft handover, depending on whether the cellular network 10 is using the data pump 14 for data transfer functions relevant to handover functions. In a hard handover, old radio links in the WTRU 15 are abandoned prior to establishing new radio links. In a soft handover, radio links are added and abandoned in such a manner that the WTRU 15 always keeps at least one radio link open to the wired network 11 Handover would apply only if traffic channels were previously established to the WTRU 15 through the cellular network 10. If traffic channels were not established, the WTRU 15 would need to establish a new traffic channel (radio bearers) into the data pump 14. If the handover was soft and the connection to the network 10 was not abandoned during communication with the data pump 14, the radio link with the wireless network 10 may be maintained during and after communication with the data pump 14.

In one embodiment of the invention, the connection information is maintained, and therefore channel assignments are not dropped at the network end. Not dropping channel assignments is desirable so as to enable re-connection immediately after the data transfer. Once the data transfer is complete, the link between the WTRU 15 and the data pump 14 is torn down. If the handover was hard then the link to the network 10 is re-established.

Figure 2:
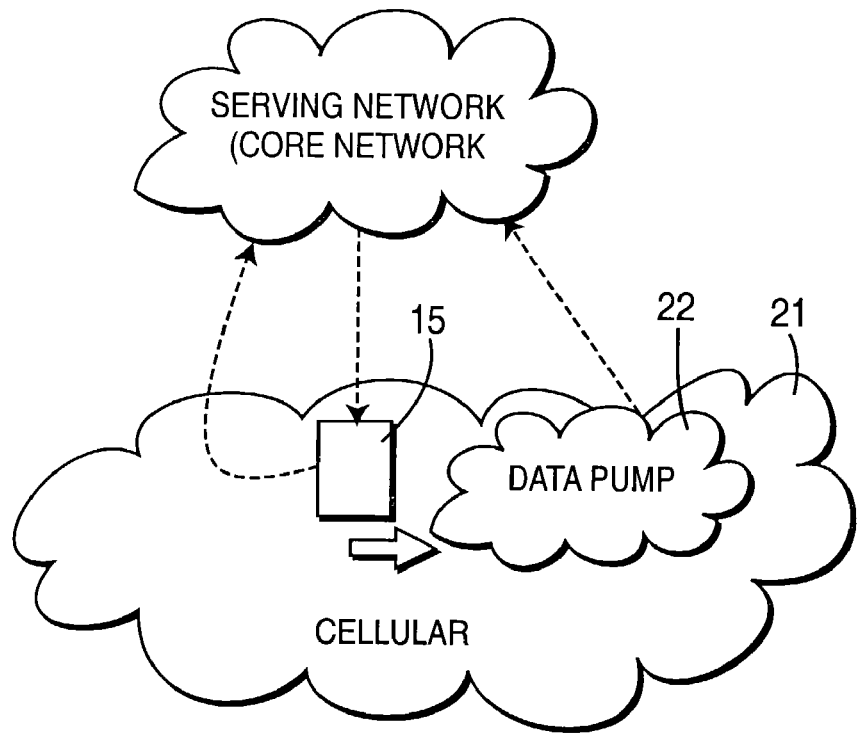
FIG. 2 shows a scenario where the WTRU is serviced by the cellular network and has the option of using a data pump.

A network of data pumps 14 may be a network overlaid on top of the cellular network 10, or it may be part of the cellular network 10. FIG. 2 shows a scenario where a WTRU 15 is being serviced by the cellular network 21 and has the option of using a local network WLAN 22, which provides the data pump function. The WTRU 15 is serviced by the cellular network 10 and has the option of using services of WLAN 22.

Figure 3:
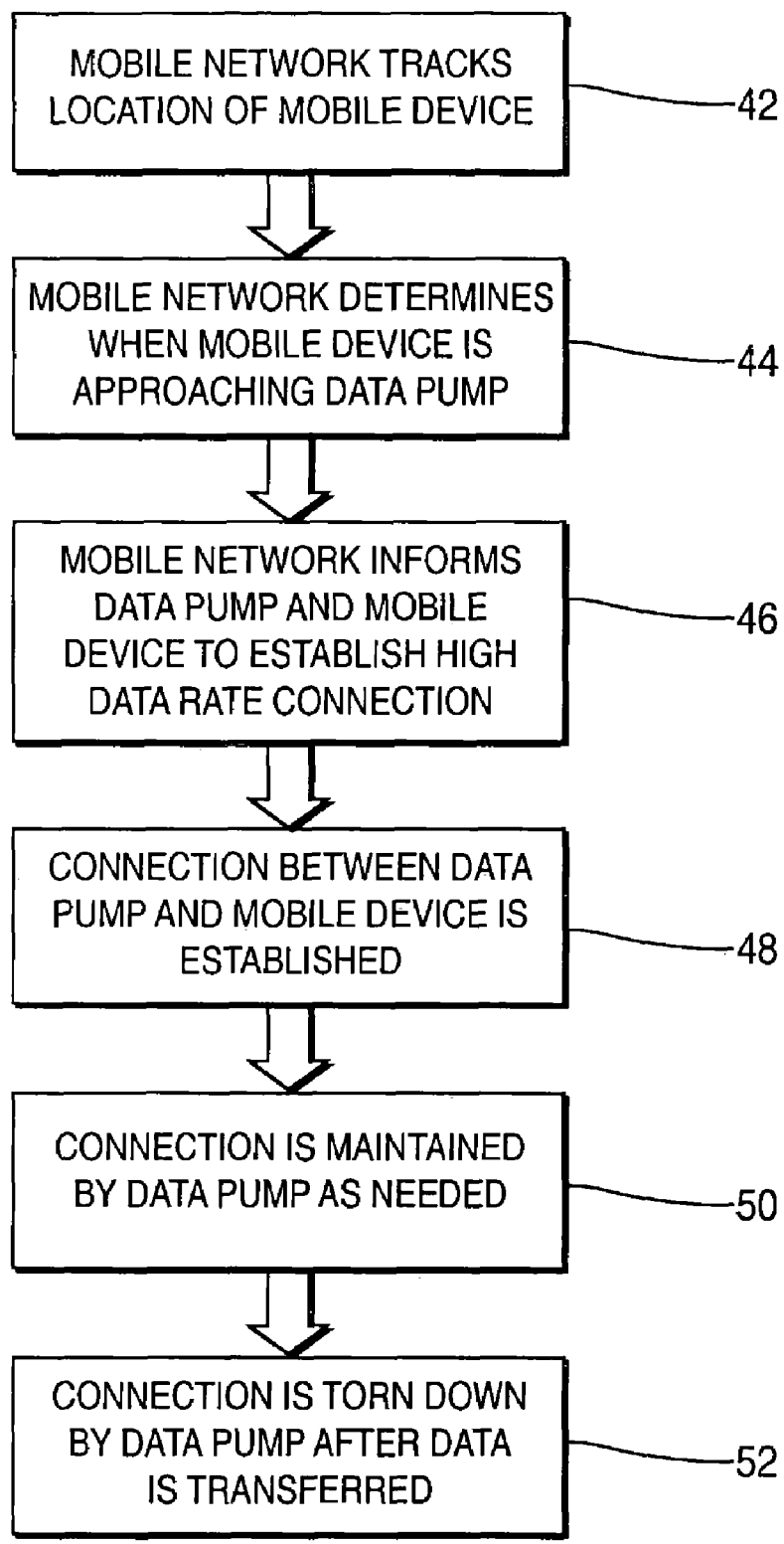
FIG. 3 is a flow diagram of a procedure for providing a high-speed localized data exchange by way of the data pump.

A procedure 40 for providing a high-speed localized data exchange is shown in FIG. 3. Once the WTRU 15 has entered the territory covered by the cellular network 10, the cellular network 10 tracks the location of the WTRU 15, such as via the base stations 13 or via the periodic updates provided by a GPS-enabled WTRU 15 (step 42). The cellular network 10 determines when the WTRU 15 is approaching a data pump 14 (step 44). The cellular network 10 informs the data pump 14 and the WTRU 15 to establish a high data rate connection (step 46). The connection between the data pump 14 and the WTRU 15 is established (step 48) and the connection is maintained by the data pump 14 as needed (step 50). Once the transfer of data has been completed, the connection is torn down by the data pump 14 (step 52).

In accordance with an exemplary embodiment, the network handles synchronization between itself and the data pump 14. The network software is also used to coordinate the data pump geographic location information with the cellular network 10. A high-speed wireless connection is then able to be established between a data pump 14 and the WTRU 15. The use of smart antenna systems can further provide highly directional communication links, which can be used to limit the connection of the data pump 14 to those locations where connection between the data pump 14 and the WTRU 15 are anticipated. This reduces the possibility of interference and also allows multiple transfers involving different WTRUs 15.

The functionality of the system-can be blended into the cellular network 10, whereby processing and deciding when to trigger the instantaneous transfer or pumping of information to/from a WTRU 15 is performed automatically. Coordination of the data pumps and the WTRUs 15 to get the resources for the transfer is automatically performed by the cellular network 10, whereby mere-instantaneous transfer of data and subsequent release of resources is provided.

One potential application that could be supported by a data pump configuration is a wireless drive-through banking which enables a user to transfer credit information, withdrawal/deposit money to or from a smart bank card while driving past a bank site. In another embodiment, a wireless digital camera will be able to upload or download pictures to/from a camera while mobile.

Figure 4:
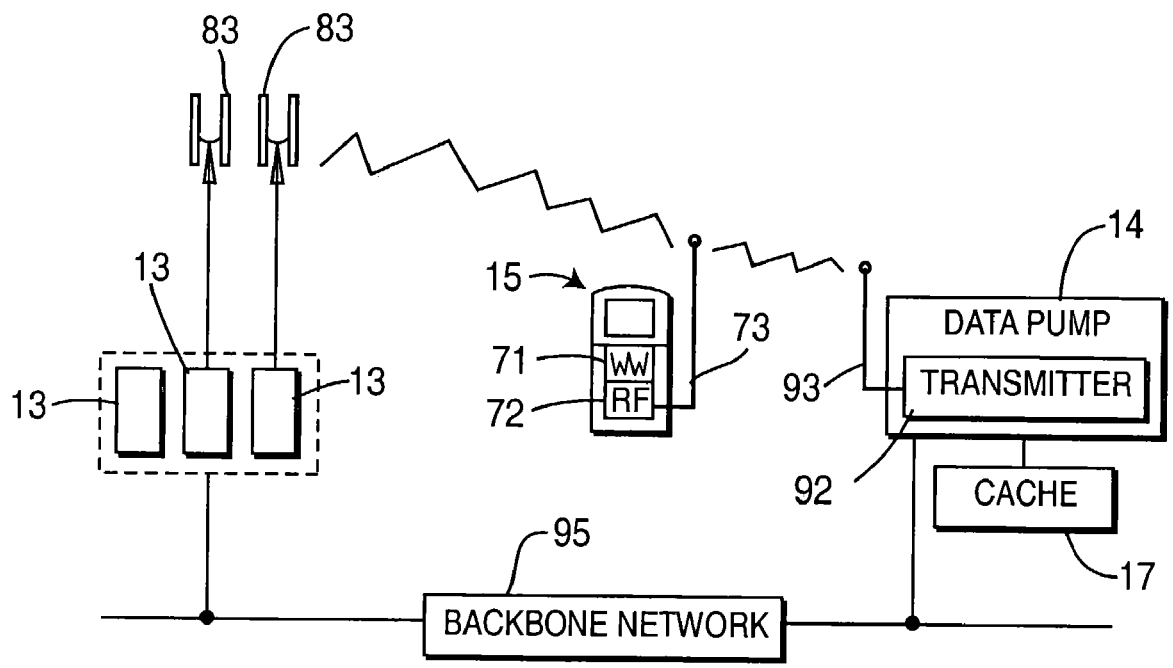
FIG. 4 is a simplified block diagram showing the circuit functions.

FIG. 4 is a simplified block diagram showing the circuit functions used to implement the present invention. The WTRU 15 includes a data processing circuit 71 and a transceiver 72, which provides the wireless connection as represented by antenna 73. The base stations 13 establish wireless connections with the WTRU 15 as represented by antennas 83. In addition wireless communications can be established with the data pump 14 via transmitter 92 as represented by antenna 93. A backbone network 95 connects the base stations 13 (cellular network) to the data pump 14. The backbone network 95 may be part of the cellular network 10 (FIG. 1) or may be partially external to the cellular network 10. If the data pump 14 is a component of the cellular system, it may be controlled by a radio network controller of the cellular network 95. The data processor 71 in the WTRU 15 indicates availability of data and acceptance of communication of data with the data pump 14. The network 95 provides downlink data to the data pump 14 or receives uplink data from the data pump 14. In addition, the network 95 controls the transfer of data between the cellular network and the data pump 14, and provides the WTRU 15 with information concerning the availability of services from the data pump 14.

The preferred embodiments are described in conjunction with the preferred application of the invention for use with voice as well as data using regular and HSDPA transmissions according to the Third Generation Partnership Project (3GPP) wideband code division multiple access (W-CDMA) communication system. The 3GPP system is used only as an example and the invention can be applied to other code division multiple access communication systems, such as GSM/GPRS and other cellular networks.

What is claimed is:

1. A system for providing high speed wireless data exchange, comprising:
 a cellular network comprising a plurality of base stations for communicating with a wireless transmit/receive unit (WTRU);
 a device locator for determining the location of the WTRU; and
 at least one data pump provided as a separate unit from the base stations, which supports high speed connection for wirelessly transferring information between said WTRU and said cellular network, whereby said connection is automatically established when said WTRU is within a certain range of said data pump;
 a database maintained by the system for comparing the determined location of the WTRU and locations of data pumps; and
 the wireless network providing the WTRU with data indicating the availability of a data pump when the determined location of the WTRU is close to a location of a data pump.

2. The system of claim 1 further comprising a data cache for storing data transferred between the network and the data pump, thereby permitting data transfer at rates exceeding a data transfer rate of a data connection between the data pump and remaining portions of the cellular network.

3. The system of claim 1 further comprising a data cache for storing data transferred to the data pump, thereby permitting data transfer at rates exceeding a data transfer rate of a data connection between the data pump and remaining portions of the cellular network.

4. The system of claim 1 further comprising a data cache for storing data transferred from the data pump, thereby permitting data transfer at rates exceeding a data transfer rate of a data connection between the data pump and remaining portions of the cellular network.

5. In a digital wireless communications network, a method of providing increased data transfer rates at specific locations, the method comprising:

using a cellular network comprising a plurality of base stations identified with the cellular network for communicating with a wireless transmit/receive unit (WTRU) to detect a location of the WTRU and generating data concerning the location;

comparing the data concerning the detected location to a database, the database including location information for localized base stations provided as a separate units from said plurality of base stations identified with the cellular network, the localized base stations providing high data transfer rates; and effecting high transfer rate communication between the WTRU and one of the localized base stations when the comparing of the data indicates a coincidence between a location of the WTRU and the location of said one of the localized base stations.

6. The method of claim 5, wherein the localized base stations include data pumps capable of effecting said high data transfer rates with WTRUs within the data pump's coverage region.

7. The method of claim 5, further comprising providing dynamic tracking of the WTRU so as to predict which localized base station will be in communication with the WTRU and to provide said information concerning the detected location to the database in anticipation of the WTRU reaching a coverage area of one of the localized base stations.

8. The method of claim 5, further comprising providing dynamic tracking of the WTRU so as to predict which localized base station will be able to communicate with the WTRU prior to data transfer negotiation, thereby facilitating said data transfer negotiation.

9. The method of claim 5, further comprising:
receiving a data request for transfer data between the WTRU and the network; and
responsive to the receipt of the data request effecting said high transfer communication.

10. The method of claim 9, comprising the network coordinating a connection of the WTRU with the localized base station.

11. The method of claim 9, comprising the network coordinating a handover of the WTRU between the localized base station and the remainder of the digital wireless communications network.

12. The method of claim 9, comprising providing a soft handover of the WTRU between the localized base station and the remainder of the digital wireless communications network coordinated between the WTRU and the data pump by the network.

13. The method of claim 9, comprising providing a hard handover of the WTRU between the localized base station and the remainder of the digital wireless communications network.

14. A wireless transmit/receive unit (WTRU) capable of increased data transfer rates at specific locations, the WTRU comprising:

a data processing circuit for receiving information from a cellular wireless network comprising a plurality of base stations identified with the cellular network for communicating with the WTRU concerning the availability of a localized base station, provided separately from said plurality of base stations identified with the cellular network and providing high data transfer rates;

a memory associated with the data processing circuit for storing data transferred between the WTRU and the localized base station;

the data processing circuit for accepting communications with the localized base station; and a data processing circuit for effecting communication between the WTRU and one of the localized base stations when the comparing of the data indicates a coincidence between a location of the WTRU and the location of said one of the localized base stations.

15. The apparatus of claim 14, wherein the data processing circuit receiving a data request for transfer data between the WTRU and the network, the data processing circuit responsive to the receipt of the data request effecting said high transfer communication.

16. The apparatus of claim 15, wherein the data processing circuit for facilitating a soft handover of the WTRU between the localized base station and the remainder of the digital wireless communications network.

17. The apparatus of claim 16, comprising the data processing circuit for facilitating hard handover of the WTRU between the localized base station and the remainder of the digital wireless communications network.

18. A digital wireless communications network comprising a plurality of base stations identified with the wireless network for communicating with a wireless transmit/receive unit (WTRU), the wireless network capable of providing increased data transfer rates at specific locations, and the network comprising:

means for detecting a location of a WTRU and generating data concerning the location;

means for comparing the data concerning the detected location to a database, the database including location information for localized base stations, provided separately from said plurality of base stations identified with the cellular network and providing high data transfer rates; and means for effecting high transfer rate communication between the WTRU and one of the localized base stations when the comparing of the data indicates a coincidence between a location of the WTRU and the location of said one of the localized base stations.

19. The apparatus of claim 18, further comprising means for providing dynamic tracking of the WTRU so as to predict which localized base station will be in communication with the WTRU, said means further providing said information concerning the detected location to the database in anticipation of the WTRU reaching a coverage area of one of the localized base stations.

20. The apparatus of claim 18, further comprising:
means for receiving a data request for transfer data between the WTRU and the network; and
means, responsive to the receipt of the data request, for effecting said high transfer communication.

21. The apparatus of claim 20, comprising means for providing a soft handover of the WTRU between the localized base station and the remainder of the digital wireless communications network.

22. The apparatus of claim 20, comprising means for providing a hard handover of the WTRU between the localized base station and the remainder of the digital wireless communications network.

* * * * *

UNITED STATES PATENT AND TRADEMARK OFFICE
CERTIFICATE OF CORRECTION

PATENT NO. : 7,039,422 B2
APPLICATION NO. : 10/629506
DATED : May 2, 2006
INVENTOR(S) : Shah et al.

It is certified that error appears in the above-identified patent and that said Letters Patent is hereby corrected as shown below:

ON THE TITLE PAGE

Item (56), FOREIGN PATENT DOCUMENTS, Page 1, right column, insert

--FOREIGN PATENT DOCUMENTS
EP 1085696 3/2001
EP 1209930 5/2002--.

At column 2, line 64, after the word "wired", delete "potion" and insert therefor --portion--.
At column 5, line 3, after "11", insert --.--.

At claim 5, column 7, line 16, after the word "separate", delete "units" and insert therefor --unit--.

Signed and Sealed this

Nineteenth Day of December, 2006

JON W. DUDAS
*Director of the United States Patent and Trademark Office*